(12) United States Patent
Barrett et al.

(10) Patent No.: US 6,178,471 B1
(45) Date of Patent: Jan. 23, 2001

(54) METHOD OF SHARING BUFFERS FOR THE STREAMING OF UNCHANGED DATA

(75) Inventors: Robert C. Barrett, San Jose, CA (US); Michael J. Howland, Vestal; Steven M. Pritko, Endicott, both of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/119,821

(22) Filed: Jul. 21, 1998

(51) Int. Cl.[7] .................................................. G06F 3/05
(52) U.S. Cl. ................... 710/52; 710/1; 710/107; 710/22; 711/162; 711/148; 711/133; 711/100
(58) Field of Search ................... 395/250, 425; 711/100, 165, 162, 148, 133; 365/78; 358/1.16; 710/107, 22

(56) References Cited

U.S. PATENT DOCUMENTS

| | | | |
|---|---|---|---|
| 4,751,675 | 6/1988 | Knauer | 365/78 |
| 5,083,269 | 1/1992 | Syobatake et al. | 395/425 |
| 5,313,602 | 5/1994 | Nakamura | 395/425 |
| 5,469,555 | * 11/1995 | Ghosh et al. | 711/133 |
| 5,473,755 | 12/1995 | Dunning | 395/250 |
| 5,511,152 | 4/1996 | Lai et al. | 395/115 |
| 5,537,563 | 7/1996 | Guttag et al. | |
| 5,539,897 | 7/1996 | Samanta et al. | 395/492 |
| 5,600,803 | 2/1997 | Iitsuka et al. | 395/287 |
| 5,649,148 | 7/1997 | Gresham | 395/427 |
| 5,890,218 | * 3/1999 | Ogawa et al. | 711/148 |
| 5,909,700 | * 6/1999 | Bitner et al. | 711/162 |
| 5,974,478 | * 10/1999 | Wood et al. | 710/22 |

* cited by examiner

*Primary Examiner*—Paul R. Lintz
*Assistant Examiner*—Jibreel Speight
(74) *Attorney, Agent, or Firm*—Ratner & Prestia; Arthur J. Samodovitz

(57) ABSTRACT

Downstream buffer objects are slaved with the immediate upstream buffer object using a conventional "write remaining" method. The write remaining method can be invoked from each of a plurality of modules having access to the read and write pipes, and operates to slave not the data, but wrappers that point to the data and which therefore represent references to a single copy of the data stored as an upstream data buffer object, so that the actual data need exist in only one place after the write remaining method has been invoked, rather than requiring the data to be sequentially copied from one data buffer to the next. This method further has the benefit of allowing control to be returned to the module during the data transfer function, and of allowing additional data to be written to the outbound pipe.

23 Claims, 5 Drawing Sheets

METHOD OF SHARING BUFFERS FOR THE STREAMING OF UNCHANGED DATA

TECHNICAL FIELD

The present invention is generally directed to transfers of data in a streaming environment and, in particular, to a more efficient method for transferring such data.

BACKGROUND OF THE INVENTION

A variety of applications advantageously perform transfers of data in a so-called "streaming" environment. In general, such transfers are accomplished with a series of modules that sequentially operate to pass data from an inbound stream (i.e., a "read" stream) to an outbound stream (i.e., a "write" stream), in this way moving the data along the prescribed stream. Such transfers of data are useful in applications including web servers (i.e., "exit" routines), servlet extensions (i.e., a potentially emerging Internet model), and other streaming environments having equivalent functionality. In practice, however, such methods have been found to exhibit certain limitations.

For example, one known practice for implementing a streaming environment is to use a basic (i.e., "trivial") approach in which data is exhaustively obtained from the read stream (or read "pipe") and then written to the write stream (or write "pipe"). This process is then followed by the writing of any new data to the write stream (i.e., down the write pipe). This solution has the disadvantage, however, that all transferred data must be copied from the read pipe to the write pipe for each of the transfers made between the plural modules which comprise the data transfer system. This leads, in turn, to an adverse system overhead which limits the efficiency and, accordingly, the overall data transfer rate that can be established using such a system.

Another known practice for implementing a streaming environment is used with CMS (conversational monitor system) pipelines. In conjunction with the operation of a CMS pipeline, a method (i.e., the so-called "SHORT" method) is provided that allows a given stage of the pipeline to connect the inbound stream directly to the outbound stream. Although this method helps to increase the efficiency of the resulting system, such a method lacks the ability to append data to the outbound stream after the data received from the inbound stream has been exhausted.

Also to be considered is that the model used by CMS pipelines is record based and, therefore, quite different from the desired model in which data is to be sequentially transferred in a way that minimizes the performance and system resource penalties associated with the copying of data as that data is transferred from module to module. Further, after exhausting its read source, each module must have the ability to write to the outbound pipe.

Therefore, the primary object of the present invention is to provide a module useful in a streaming environment that can pass data from the inbound stream to the outbound stream in a way that minimizes the performance and resource penalties associated with the copying of data. Another object of the present invention is to provide a module useful in a streaming environment that can efficiently pass data from the inbound stream to the outbound stream and that has the ability to return control to the module during the data transfer function. Still another object of the present invention is to provide a module useful in a streaming environment that can efficiently pass data from the inbound stream to the outbound stream and which, after exhausting the read source, has the ability to write additional data to the outbound pipe.

SUMMARY OF THE INVENTION

These and other objects which will become apparent are achieved in accordance with the present invention by slaving downstream buffer objects with the immediate upstream buffer object using the so-called "write remaining" method which is conventionally associated with each module. The write remaining method is invoked from each module having access to the read and write pipes, and operates to slave not the data, but wrappers that point to the data and which in this way represent references to a single copy of the data stored as an upstream data buffer object.

This method has the benefit of allowing the actual data to exist in only one place after the write remaining method has been invoked, rather than requiring the data to be sequentially copied from one data buffer to the next. This method further has the benefit of allowing control to be returned to the module during the data transfer function, and of allowing additional data to be written to the outbound pipe.

It is to be understood that both the foregoing general description and the following detailed description are exemplary, but are not restrictive, of the invention.

DESCRIPTION OF THE DRAWING

The invention is best understood from the following detailed description when read in connection with the accompanying drawing. Included in the drawing are the following figures.

DETAILED DESCRIPTION OF PREFERRED EMBODIMENTS

Figure 1:
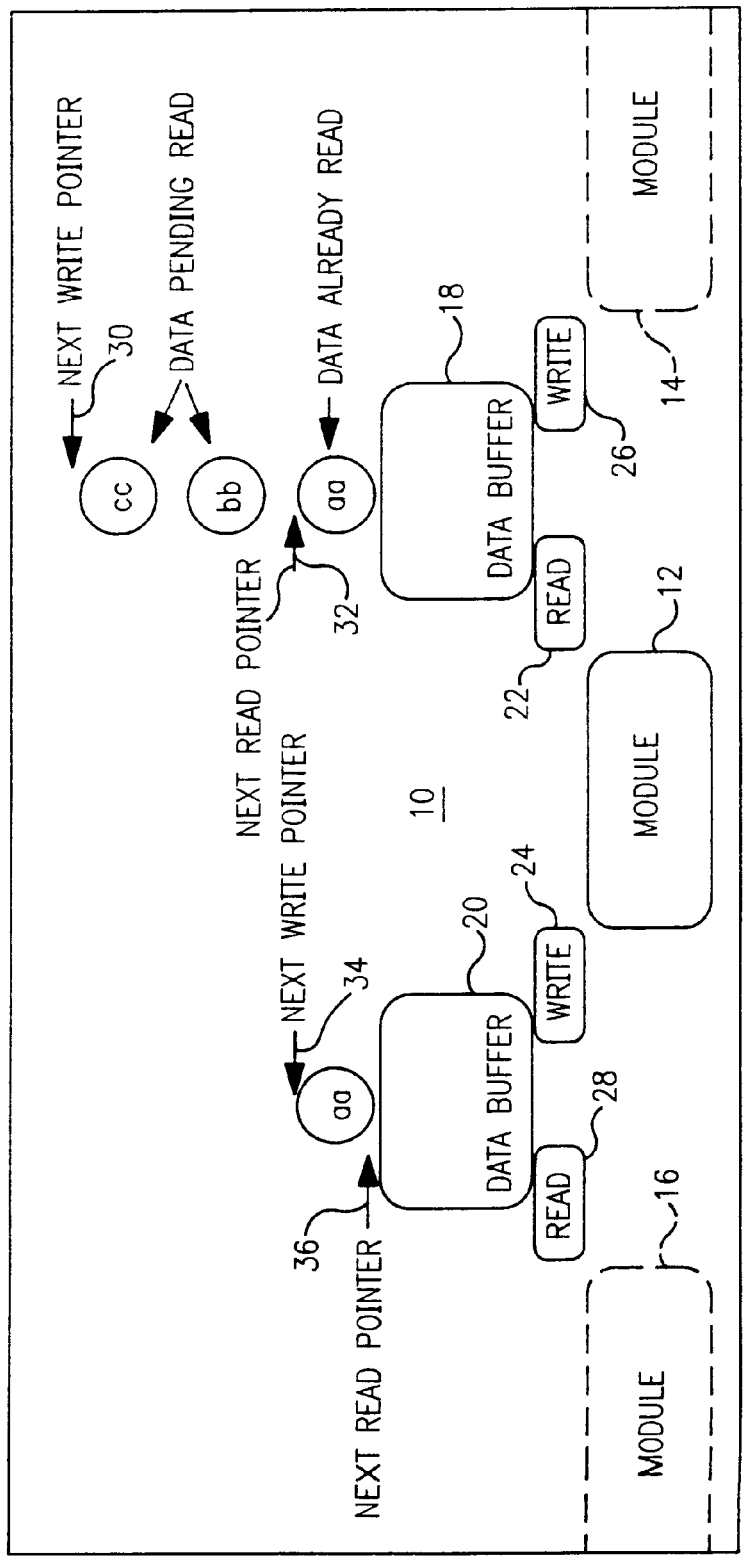
FIG. 1 is a block diagram showing a conventional module for transferring data in a streaming environment.

In a conventional streaming environment, a plurality of modules are serially interconnected to develop the desired stream. FIG. 1 illustrates one segment 10 of the developed stream, which is generally comprised of a module 12 connecting an upstream module 14 with a downstream module 16 (modules 14 and 16 are shown in phantom in FIG. 1). Each of the modules 12, 14, 16 constitutes a discrete unit of code running in a separate process (or thread). It will be understood that the structure schematically shown in FIG. 1 will in practice be repeated, as needed, to fully develop the desired stream, with each module operating in similar fashion to transfer data as will be described more fully below.

To this end, the modules 12, 14, 16 are coupled by data buffers 18, 20. The upstream data buffer 18 communicates with the module 12 through a read pipe 22, and the module 12 in turn communicates with the downstream data buffer 20 through a write pipe 24. As previously indicated, the upstream module 14 also communicates with the upstream data buffer 18, through the write pipe 26, and the downstream module 16 also communicates with the downstream data buffer 20, through the read pipe 28, completing the segment 10 of the developed stream (i.e., a read/process/write loop).

In operation, let it be assumed that data (e.g., the data items "aa," "bb," and "cc") have been received from the upstream module 14 (through the write pipe 26). Such data will enter the data buffer 18, and will be defined by and between a leading (write) pointer 30 and a trailing (read) pointer 32. In turn, the data item "aa" will be passed from the data buffer 18 to the module 12 (through the read pipe 22) and from the module 12 to the data buffer 20 (through the write pipe 24). Additional data items can be added to the data items "aa," "bb," and "cc" during this process, if desired. This transfer of data will require the entire data item "aa" to be copied, however, from the data buffer 18 to the data buffer 20 (i.e., between the write pointer 34 and the read pointer 36). Such copying limits the data transfer rate which can be achieved, as previously indicated and increases system overhead (i.e., system resources due to data copies).

Figure 2:
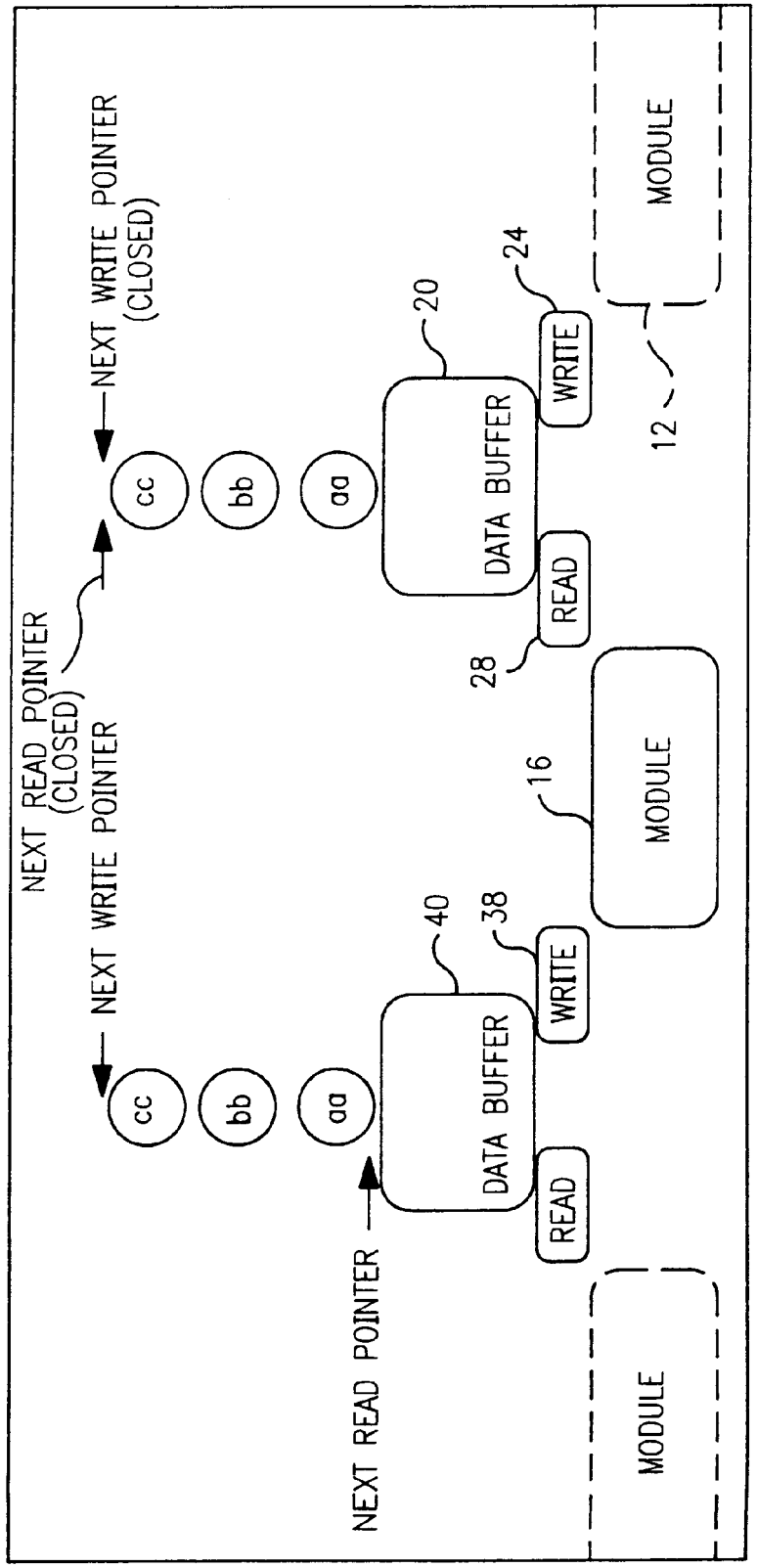
FIG. 2 is a block diagram showing how the module of FIG. 1 operates to execute a conventional write remaining command.

Referring to FIG. 2, let it now be assumed that the downstream module 16 has invoked the write remaining method for the data then held in the data buffer 20. Invoking the write remaining method causes all remaining data to be written downstream, essentially forwarding all of the remaining data downstream. For what would essentially constitute a "trivial case," execution of the write remaining command would cause the data (i.e., the data items "aa," "bb," and "cc") in the data buffer 20 to be read from the read pipe 28, to exhaustion, and written to the outbound (write) pipe 38. After exhausting the read pipe 28, data can continue to be added to the write pipe 38, if desired. The module 16 would then operate to transfer the written data (through the write pipe 38) to a further downstream data buffer 40.

The foregoing operations satisfy the overall objectives for a streaming environment. This solution has the corresponding disadvantage, however, of incurring the overhead associated with the reading (i.e., making a copy) and writing (making yet another copy) of data. As can be seen in FIG. 2, the data then exists as state data in both data buffer objects (i.e., the data buffer 20 and the data buffer 40), which is not optimal.

In accordance with the present invention, a similar outcome is achieved by slaving not the data, but "wrappers" that represent references to a copy (a single copy) of the data to the upstream data buffer object. This method has the benefit of allowing the actual data to exist in only one place after the write remaining method has been invoked. It should be noted that such slaving (of references) takes place only after a write remaining operation has been invoked.

Figure 3:
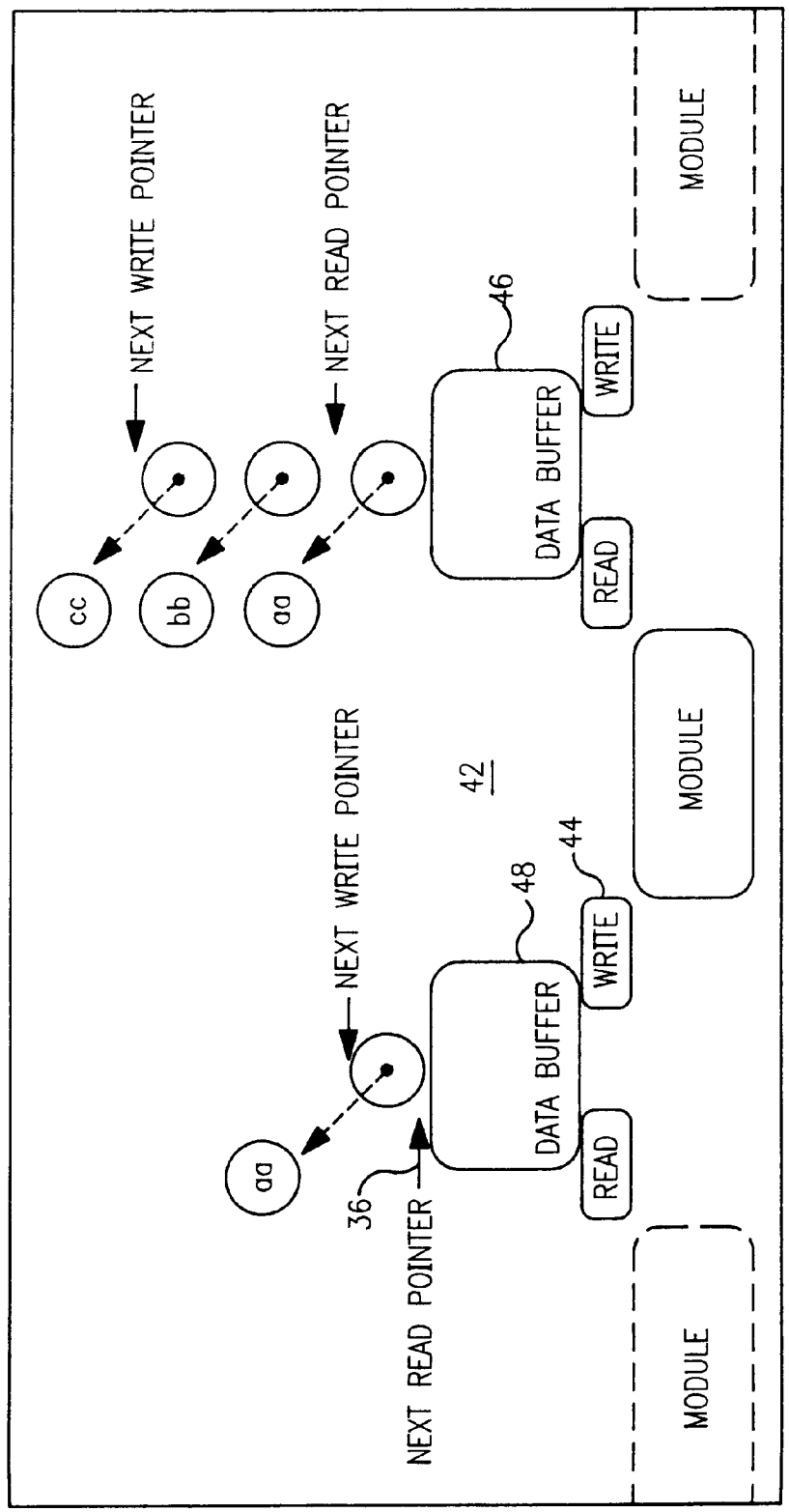
FIG. 3 is a block diagram showing how the module of FIG. 1 operates in a non-write remaining case.

Consider next the operations shown in FIG. 3, which represent the state of a segment 42 (a partial module chain) before calling a write remaining operation. As is evident in FIG. 3, the writing of data (through the write pipe 44) to the outbound pipe in a non-write remaining case results in the copying of data from one data buffer to the next (i.e., both the data buffer 46 and the data buffer 48 include their own copy of the data item "aa").

Figure 4:
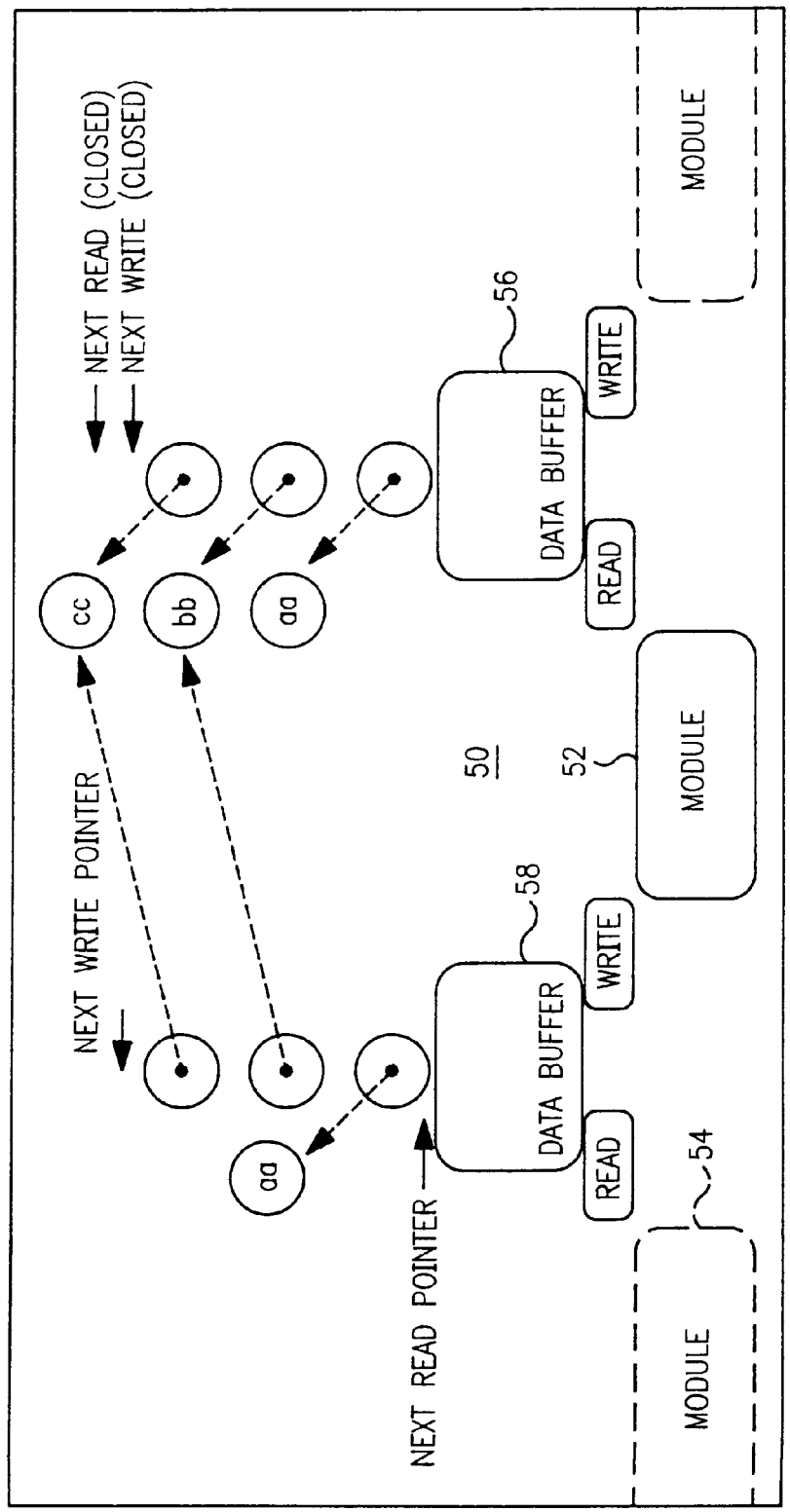
FIG. 4 is a block diagram showing how the module of FIG. 1 operates to execute a write remaining command in accordance with the present invention.

In contrast, the benefits achieved for the write remaining case can be seen in FIG. 4, which shows the results achieved for a segment 50 having a module 52 which calls a write remaining method. From FIG. 4, it can be seen that the module 54 which is downstream of the writing module 52 has access (read access) to the upstream data, even though the actual data was never copied from the data buffer 56 to the data buffer 58 during the write remaining operation. In addition, the module 52 has the option of appending new data (data created within the module) to the outbound stream. To this end, the write remaining operation remains blocked from the point of view of the module 52, allowing further control of desired, subsequent operations to be assumed by the module 52 until the data buffer 56 has closed its outbound stream.

Figure 5:
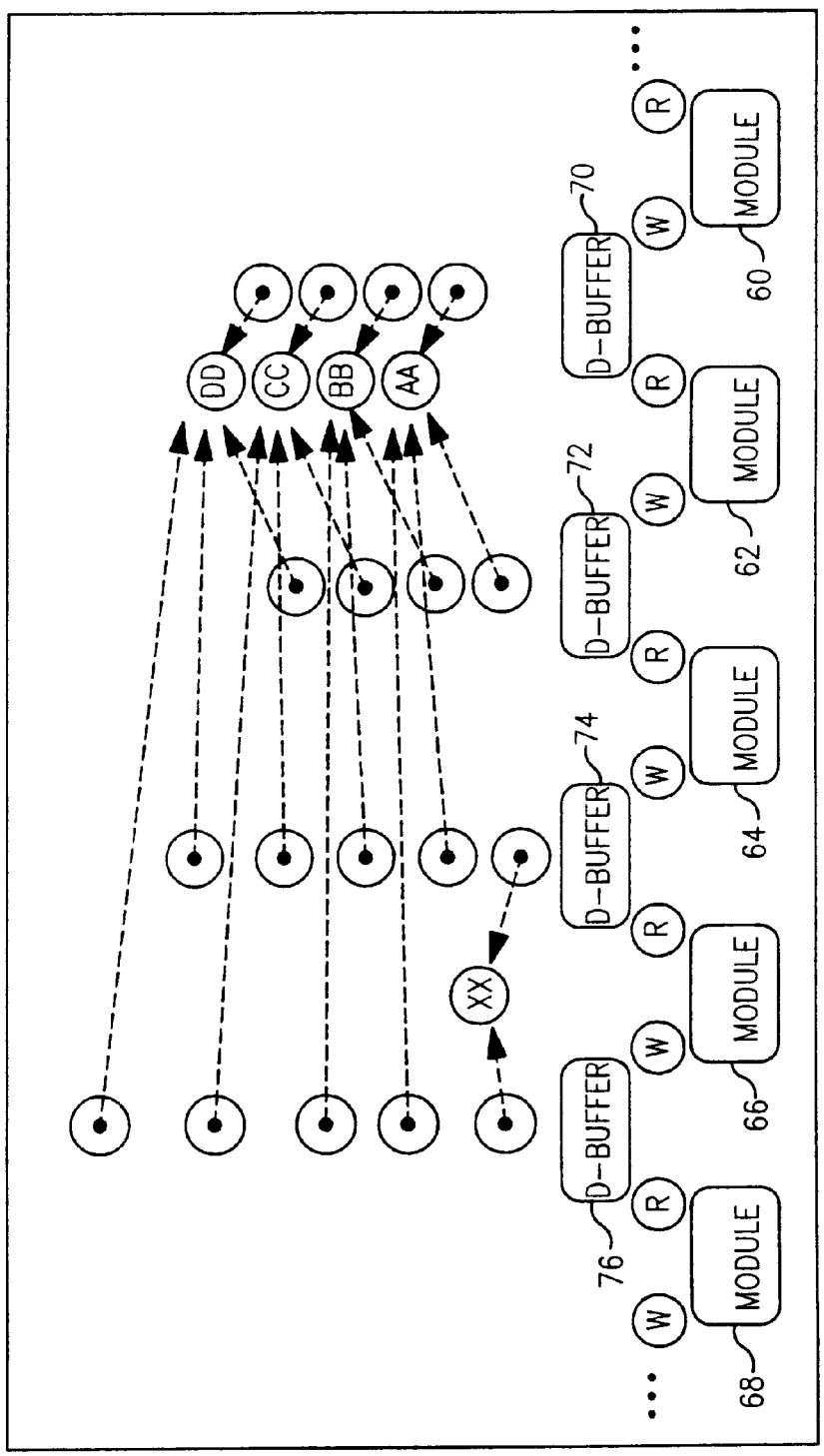
FIG. 5 is a block diagram showing how a series of modules corresponding to the module of FIG. 1 operate in accordance with the present invention.

It will be understood that the foregoing operations are not limited to a single data buffer(out)/module/data buffer(in) configuration, and that even more significant savings can be achieved in accordance with the present invention when plural modules are combined (serially connected) to form a chain. As an example, FIG. 5 shows the results achievable for a series of modules 60, 62, 64, 66, 68. In this example, the modules 62, 66 call a write remaining operation and close the output stream after control is returned immediately after invoking the write remaining command. The module 64 operates to write the data item "xx" before calling write remaining.

Every data buffer object 70, 72, 74, 76 then references the same block of data, where possible, in this way eliminating the need to copy data. A call to write remaining serves to provide all downstream buffers with an un-altered copy of the data from that (i.e., the current) read point. Control is not returned to the calling module until the read input stream is exhausted (i.e., closed). In each case, the same copy of the data can be used. If one of the modules introduces data that may have been altered (either through fabrication, as shown as data item "xx" in FIG. 5, or by trivially reading from the read pipe and writing to the write pipe), the creation of a fresh buffer will be required.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. The present invention can further be embodied in the form of computer-implemented processes and apparatus for practicing such processes, and can be embodied in the form of computer program code embodied in tangible media, such as floppy diskettes, fixed (hard) drives, CD ROM's, magnetic tape, fixed/integrated circuit devices, or any other computer-readable storage medium, such that when the computer program code is loaded into and executed by a computer, the computer becomes an apparatus for practicing the invention.

What is claimed:

1. A method for transferring data in a streaming environment while minimizing performance and resource penalities associated with copying of the data, wherein the streaming environment is defined by a plurality of modules coupled with a corresponding plurality of data buffers for containing data objects in the course of transferring the data, and wherein the method comprises the steps of:

transferring the data from upstream data buffers to downstream data buffers, wherein the transferring of the data from the upstream data buffers to the downstream data buffers includes transfers of the data from a first data buffer to a downstream module and transfers of the data from the downstream module to a second data buffer downstream from the first data buffer;

slaving a downstream data object with an upstream data object by invoking a write remaining method for at least one of the modules, wherein the invoking of the write remaining method includes the step of pointing to the data to reference a single copy of the data stored as an upstream data object; and returning control to the module following the invoking of the write remaining method.

2. The method of claim 1 wherein the downstream data object is slaved to an immediate upstream data object.

3. The method of claim 1 wherein the write remaining method is invoked for each of the modules defining the streaming environment.

4. The method of claim 1 wherein the modules defining the streaming environment are coupled in series combination.

5. The method of claim 1 wherein each of the modules has access to a read pipe and a write pipe, and wherein the method further includes the step of slaving wrappers pointing to the data in the data buffers to reference the single copy of the data stored as the upstream data object.

6. The method of claim 1 wherein the returning of control to the module includes the step of appending data to the data being transferred.

7. The method of claim 6 which further includes the step of creating a fresh buffer for modules appending altered data.

8. The method of claim 1 wherein the data is read from a read pipe coupled with one of the modules, and wherein the method further includes the steps of exhausting the data read from the read pipe and closing the module following the invoking of the write remaining method for the module.

9. The method of claim 8 wherein the control is returned to the module only after the data read from the read pipe is exhausted.

10. The method of claim 1 which further includes the step of transferring the data from upstream data buffers to downstream data buffers without copying the data.

11. A program storage device readable by a machine, tangibly embodying a program of instructions executable by the machine to perform method steps for transferring data in a streaming environment while minimizing performance and resource penalties associated with copying of the data, wherein the streaming environment is defined by a plurality of modules coupled with a corresponding plurality of data buffers for containing data objects in the course of transferring the data, said method steps comprising:

slaving a downstream data object with an upstream data object by invoking a write remaining method for at least one of the modules, wherein the invoking of the write remaining method includes the step of pointing to the data to reference a single copy of the data stored as an upstream data object; and returning control to the module following the invoking of the write remaining method.

12. The program storage device of claim 11 wherein said method steps further include slaving the downstream data object to an immediate upstream data object.

13. The program storage device of claim 11 wherein said method steps further include invoking the write remaining method for each of the modules defining the streaming environment.

14. The program storage device of claim 11 wherein said method steps further include coupling the modules defining the streaming environment in series combination.

15. The program storage device of claim 11 wherein each of the modules has access to a read pipe and a write pipe, and wherein said method steps further include slaving wrappers pointing to the data in the data buffers to reference the single copy of the data stored as the upstream data object.

16. The program storage device of claim 11 wherein said method steps further include appending data to the data being transferred when the control is returned to the module.

17. The program storage device of claim 16 wherein said method steps further include creating a fresh buffer for modules appending altered data.

18. The program storage device of claim 11 wherein the data is read from a read pipe coupled with one of the modules, and wherein said method steps further include exhausting the data read from the read pipe and closing the module following the invoking of the write remaining method for the module.

19. The program storage device of claim 18 wherein said method steps further include returning the control to the module only after the data read from the read pipe is exhausted.

20. The program storage device of claim 11 wherein said method steps further include transferring the data from upstream data buffers to downstream data buffers without copying the data.

21. The program storage device of claim 11 wherein said method steps further include the transferring of data in a streaming environment by transferring the data from upstream data buffers to downstream data buffers, wherein the transferring of the data from the upstream data buffers to the downstream data buffers includes transfers of the data from a first data buffer to a downstream module and transfers of the data from the downstream module to a second data buffer downstream from the first data buffer.

22. The method of claim 1 which further includes the step of transferring the data from upstream data buffers to downstream data buffers, wherein the transferring is limited to transfers of data from a data buffer to a downstream module and transfers of data from the module to a downstream data buffer.

23. The program storage device of claim 11 wherein said method steps further include transferring the data from upstream data buffers to downstream data buffers, wherein the transferring is limited to transfers of data from a data buffer to a downstream module and transfers of data from the module to a downstream data buffer.

* * * * *